(12) United States Patent
Nakai

(10) Patent No.: US 8,529,067 B2
(45) Date of Patent: Sep. 10, 2013

(54) PROJECTOR APPARATUS AND IMAGE SYNTHESIZING DEVICE FOR THE SAME

(75) Inventor: Fuki Nakai, Tokyo (JP)

(73) Assignee: Sony Corporation (JP)

(*) Notice: Subject to any disclaimer, the term of this patent is extended or adjusted under 35 U.S.C. 154(b) by 434 days.

(21) Appl. No.: 12/459,780

(22) Filed: Jul. 8, 2009

(65) Prior Publication Data

US 2010/0007853 A1 Jan. 14, 2010

(30) Foreign Application Priority Data

Jul. 10, 2008 (JP) ................................ P2008-179690

(51) Int. Cl.
*G03B 21/14* (2006.01)

(52) U.S. Cl.
USPC .................... 353/20; 353/30; 353/31; 353/33; 353/84; 353/98; 353/99; 353/121; 353/122

(58) Field of Classification Search
USPC .............. 353/20, 30, 31, 33, 84, 98, 99, 122, 353/121; 359/237, 290–292, 295, 267, 269, 359/298, 487.01, 487.02, 487.03, 487.04, 359/487.05, 489.09; 349/8, 7, 5, 9, 96, 97
See application file for complete search history.

(56) References Cited

U.S. PATENT DOCUMENTS

| | | | | |
|---|---|---|---|---|
| 6,639,354 B1 * | 10/2003 | Kojima et al. | ................ | 313/498 |
| 6,869,185 B2 * | 3/2005 | Kaminsky et al. | ............. | 353/31 |
| 6,882,379 B1 * | 4/2005 | Yokoyama et al. | ............ | 349/61 |
| 6,961,179 B2 * | 11/2005 | Chen et al. | ............... | 359/485.04 |
| 6,991,334 B2 * | 1/2006 | Okuyama et al. | ............... | 353/20 |
| 7,125,761 B2 * | 10/2006 | Tanaka | .......................... | 438/166 |
| 7,126,652 B2 * | 10/2006 | Yokoyama et al. | ............. | 349/61 |
| 7,502,078 B2 * | 3/2009 | Suzuki | ............................. | 349/8 |
| 7,804,558 B2 * | 9/2010 | Sasaki et al. | .................... | 349/96 |
| 2003/0048421 A1 * | 3/2003 | Du | ................................... | 353/31 |
| 2003/0103171 A1 * | 6/2003 | Hall et al. | .......................... | 349/5 |
| 2005/0094104 A1 * | 5/2005 | Ishizaka et al. | ................. | 353/20 |
| 2008/0037095 A1 | 2/2008 | Sakina | | |
| 2008/0055722 A1 * | 3/2008 | Perkins et al. | ................ | 359/486 |

FOREIGN PATENT DOCUMENTS

| | | |
|---|---|---|
| JP | 2006301338 A | 11/2006 |
| JP | 2008-040335 A | 2/2008 |

OTHER PUBLICATIONS

Office Action from Japanese Application No. 2008-179690, dated Jul. 31, 2012.

* cited by examiner

*Primary Examiner* — Georgia Y Epps
*Assistant Examiner* — Sultan Chowdhury
(74) *Attorney, Agent, or Firm* — Lerner, David, Littenberg, Krumholz & Mentlik, LLP

(57) ABSTRACT

An image synthesizing device for a projector apparatus includes first, second, third polarizing beam splitters respectively provided for red light, green light, and blue light; and a light combining unit configured to combine and output the red light, the green light, and the blue light passing through the first, second, and third polarizing beam splitters. The first, second, and third polarizing beam splitters respectively include first, second, and third polarizing films. The first and second polarizing films where the red light and the green light enter are each formed of an organic material, and the third polarizing film where the blue light enters is formed of an inorganic material.

6 Claims, 6 Drawing Sheets

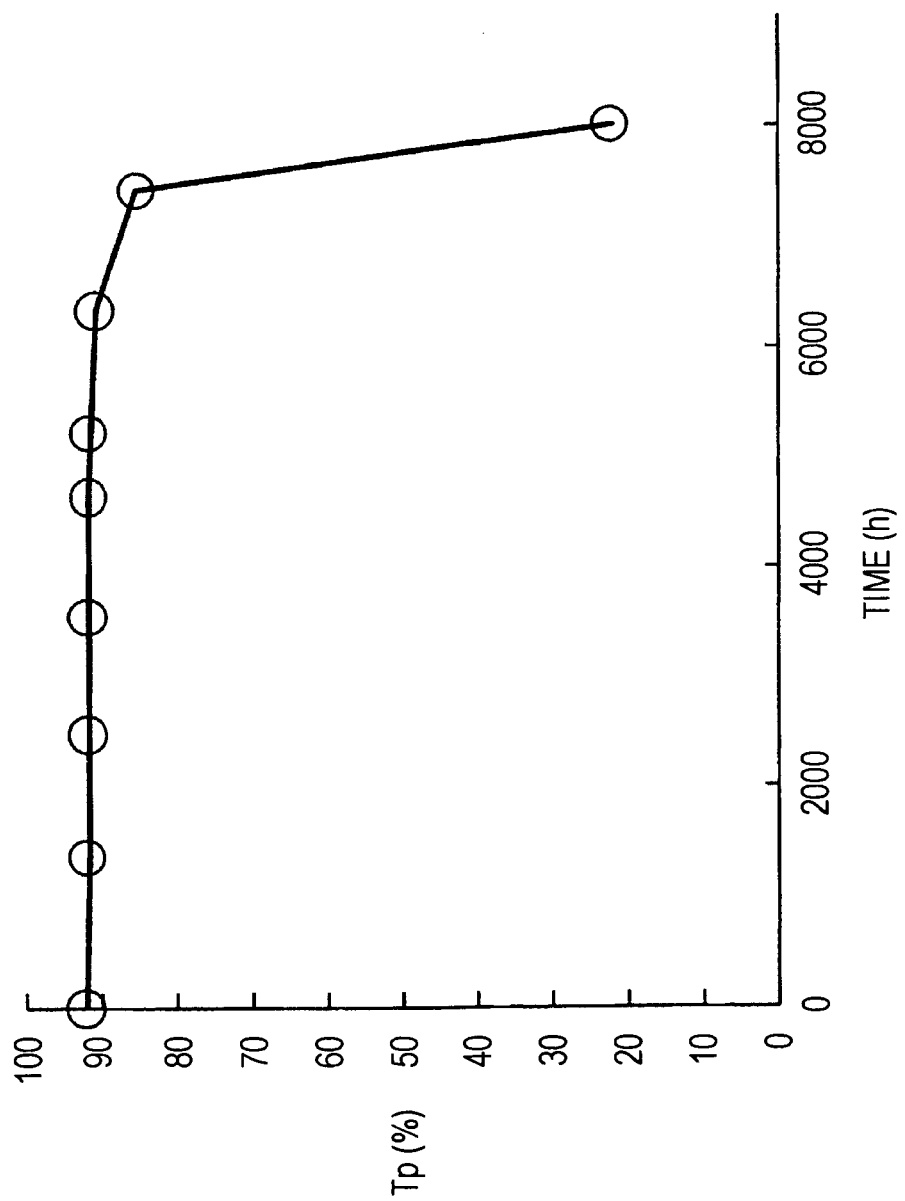

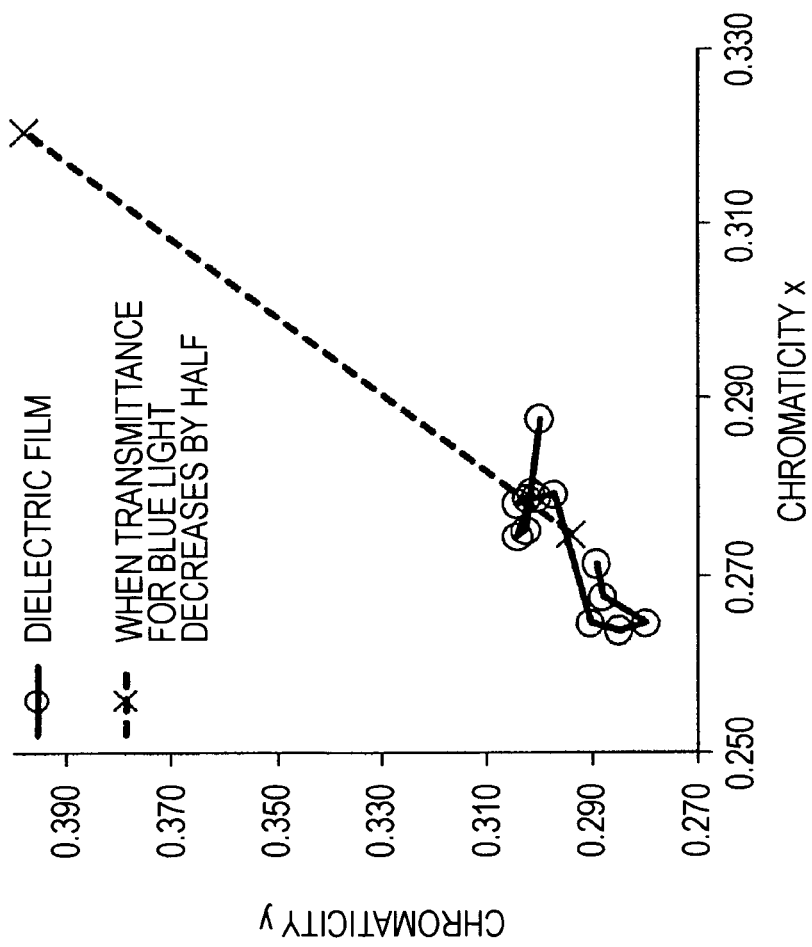

PROJECTOR APPARATUS AND IMAGE
SYNTHESIZING DEVICE FOR THE SAME

CROSS-REFERENCE TO RELATED
APPLICATION

The present application claims priority from Japanese Patent Application JP 2008-179690 filed in the Japanese Patent Office on Jul. 10, 2008, the entire content of which is incorporated herein by reference.

BACKGROUND OF THE INVENTION

1. Field of the Invention

The present invention relates to a projector apparatus and an image synthesizing device for the projector apparatus.

2. Description of the Related Art

Japanese Unexamined Patent Application Publication No. 2008-40335 proposes a projector apparatus including a separation unit, first, second, and third polarizing beam splitters, first, second, and third reflective liquid crystal display devices, and a light combining unit. The separation unit separates light from a light source into a red light beam, a green light beam, and a blue light beam. The first, second, and third polarizing beam splitters are respectively provided for the red light beam, the green light beam, and the blue light beam led from the separation unit, and respectively receive the light beams. The first, second, and third reflective liquid crystal display devices are respectively provided for the first, second, and third polarizing beam splitters so as to modulate the light beams reflected by the polarizing beam splitters according to image information and to reflect and cause the light beams to pass through the polarizing beam splitters. The light combining unit combines and emits the light beams passing through the polarizing beam splitters.

SUMMARY OF THE INVENTION

Each of the first, second, and third polarizing beam splitters includes a polarizing film that transmits or reflects light in accordance with the polarizing direction (vibrating direction) of the light. In other words, the polarizing film reflects s-polarized light and transmits p-polarized light.

However, the polarizing film does not completely reflect s-polarized light, but transmits a small part of the s-polarized light. Therefore, as the s-polarized light transmittance for s-polarized light decreases, a dark image (black image) of images obtained from the projector apparatus can become darker. This can increase the contrast of images obtained from the projector apparatus.

In recent years, a polarizing beam splitter that uses a polarizing film made of an organic material having a low s-polarized light transmittance has been proposed.

However, the light transmittance of the polarizing film made of an organic material gradually decreases because of ultraviolet irradiation. Therefore, there is a fear that such a polarizing film is disadvantageous for durability of the projector apparatus.

It is desirable to provide a projector apparatus that ensures a high contrast and is advantageous in increasing durability, and an image synthesizing device for the projector apparatus.

An image synthesizing device for a projector apparatus according to an embodiment of the present invention includes first, second, third polarizing beam splitters respectively provided for red light, green light, and blue light; and a light combining unit configured to combine and output the red light, the green light, and the blue light passing through the first, second, and third polarizing beam splitters. The first, second, and third polarizing beam splitters respectively include first, second, and third polarizing films. The first and second polarizing films where the red light and the green light enter are each formed of an organic material, and the third polarizing film where the blue light enters is formed of an inorganic material.

A projector apparatus according to another embodiment of the present invention includes a light source; a separation unit configured to separate light from the light source into red light, green light, and blue light; first, second, and third polarizing beam splitters respectively provided for the red light, the green light, and the blue light guided from the separation unit, the first, second, and third polarizing beam splitters respectively reflecting the red light, the green light, and the blue light; first, second, and third spatial modulators respectively provided for the first, second, and third polarizing beam splitters, the first, second, and third spatial modulators modulating the red light, the green light, and the blue light according to image information and reflecting the red light, the green light, and the blue light so that the red light, the green light, and the blue light pass through the first, second, and third polarizing beam splitters; a light combining unit configured to combine and output the red light, the green light, and the blue light passing through the first, second, and third polarizing beam splitters; and a projection lens configured to project the combined light output from the light combining unit onto a screen. The first, second, and third polarizing beam splitters respectively include first, second, and third polarizing films. The first and second polarizing films where the red light and the green light enter are each formed of an organic material, and the third polarizing film where the blue light enters is formed of an inorganic material.

According to the embodiments of the present invention, since the polarizing films where red light and green light enter are each formed of an organic material, a high contrast of an image formed on the screen by light output from the light combining unit can be ensured. Further, since the polarizing film where blue light enters is formed of an inorganic material, it is rarely deteriorated by ultraviolet light contained in the blue light, and this is advantageous in durability.

BRIEF DESCRIPTION OF THE DRAWINGS

FIG. 5 shows how a p-polarized light transmittance of the polarizing film made of the organic material changes with time; and FIG. 6 shows results of measurement of chromaticity conducted when white light is emitted from the image synthesizing device.

DESCRIPTION OF THE PREFERRED
EMBODIMENTS

An embodiment of the present invention will now be described with reference to the drawings.

Figure 1:
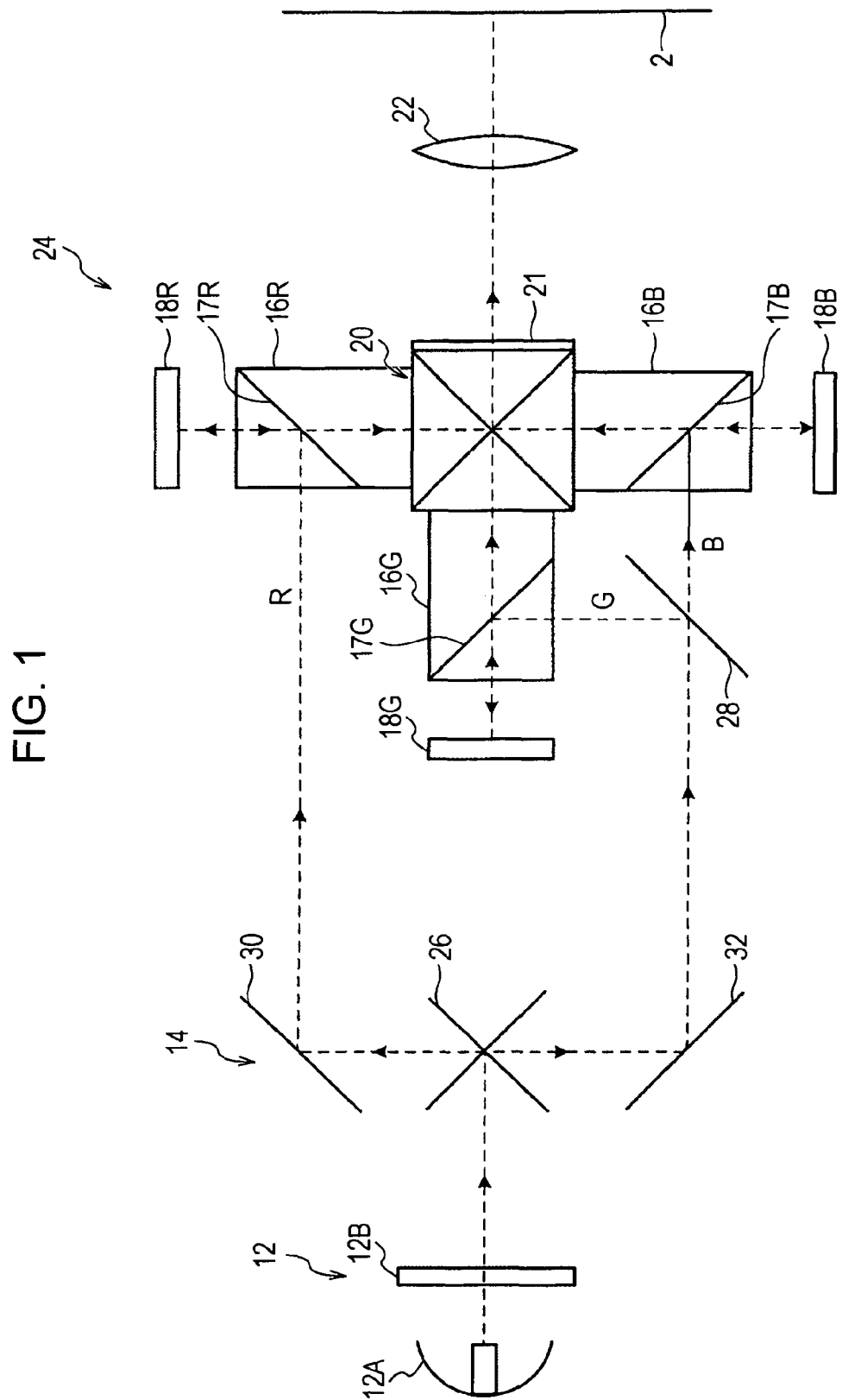
FIG. 1 is an explanatory view illustrating a configuration of a projector apparatus according to an embodiment.
Figure 2:
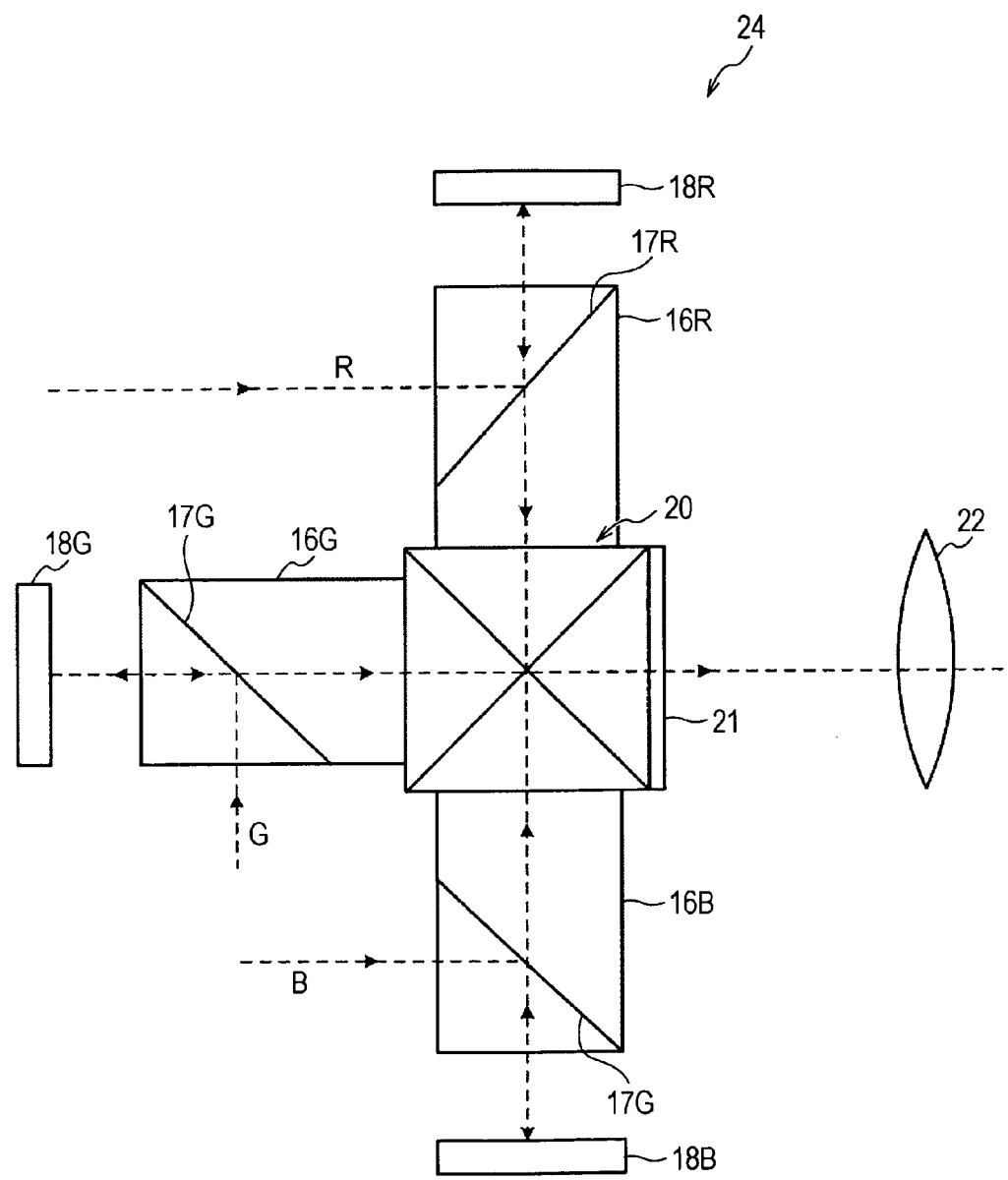
FIG. 2 is an explanatory view illustrating a configuration of an image synthesizing device in the embodiment.

FIG. 1 is an explanatory view showing a configuration of a projector apparatus 10 according to the embodiment, and FIG. 2 is an explanatory view showing a configuration of an image synthesizing device 24 in the embodiment.

Referring to FIG. 1, the projector apparatus 10 includes a light source 12, a separation unit 14, first, second, and third polarizing beam splitters 16R, 16G, and 16B, first, second, and third reflective spatial modulators 18R, 18G, and 18B, a light combining unit 20, and a projection lens 22.

Light Source 12

The light source 12 includes a lamp 12A for emitting white light.

As the lamp 12A, various lamps, such as an ultrahigh pressure lamp for emitting white light, are used.

A polarization conversion element 12B for making polarizing directions of light from the lamp 12A the same is provided in front of the lamp 12A. In the embodiment, the polarization conversion element 12B serves to convert light from the lamp 12A into s-polarized light.

Separation Unit 14

The separation unit 14 separates light from the light source 12 into a red light beam, a green light beam, and a blue light beam, and guides the red, green, and blue light beams to the first, second, and third polarizing light beam splitters 16R, 16G, and 16B, respectively.

In this embodiment, the separation unit 14 includes first and second dichroic mirrors 26 and 28 and first and second reflecting mirrors 30 and 32.

The first dichroic mirror 26 separates light R in a red wavelength region and light in a green and blue wavelength region from the light guided from the light source 12.

The first reflecting mirror 30 reflects the light R in the red wavelength region separated by the first dichroic mirror 26, and guides the light R to the first polarizing beam splitter 16R.

The second reflecting mirror 32 reflects light in the green and blue wavelength region separated by the first dichroic mirror 26.

The second dichroic mirror 28 reflects only light G in the green wavelength region from the light in the green and blue wavelength region reflected by the second reflecting mirror 32, guides the light G to the second polarizing beam splitter 16G, and reflects and guides light B in the blue wavelength region to the third polarizing beam splitter 16B.

Since it is satisfactory as long as the separation unit 14 can separate the light from the light source 12 into red light, green light, and blue light, the structure of the separation unit 14 is not limited to the above, but various structures can be adopted.

Reflective Spatial Modulators 18R, 18G, and 18B

The first, second, and third reflective spatial modulators 18R, 18G, and 18B are provided for the first, second, and third polarizing beam splitters 16R, 16G, and 16B, respectively. The first, second, and third reflective spatial modulators 18R, 18G, and 18B respectively modulate the light reflected by the polarizing beam splitters 16R, 16G, and 16B according to image information, and reflect and cause the light to pass through the polarizing beam splitters 16R, 16G, and 16B.

More specifically, the first, second, and third reflective spatial modulators 18R, 18G, and 18B display information about images of three colors, red, green, and blue. Each reflective spatial modulator receives a color picture signal corresponding to incident light, and modulates and outputs the incident light according to the picture signal after turning the polarizing direction of the incident light 90 degrees. In other words, the reflective spatial modulator converts incident light from s-polarized light into p-polarized light, and then modulates and outputs the p-polarized light.

When an input picture signal is black (the darkest), the first, second, and third reflective spatial modulators 18R, 18G, and 18B reflect the incident light as s-polarized light without converting the incident light from the s-polarized light into p-polarized light.

In this embodiment, the first, second, and third reflective spatial modulators 18R, 18G, and 18B are each formed by a reflective liquid crystal panel.

The first, second, and third reflective spatial modulators 18R, 18G, and 18B are not limited to reflective liquid crystal panels, and may be formed by various reflective spatial modulators such as a transmissive liquid crystal panel and a DMD (digital micro mirror device) using multiple small reflecting mirrors.

First, Second, and Third Polarizing Beam Splitters 16R, 16G, and 16G

The first, second, and third polarizing beam splitters 16R, 16G, and 16B are respectively provided for the light R, the light G, and the light B guided from the separation unit 14, and the light R, the light G, and the light B respectively enter the polarizing beam splitters.

The first, second, and third polarizing beam splitters 16R, 16G, and 16B include first, second, and third polarizing films 17R, 17G, and 17B, respectively.

In the embodiment, each polarizing beam splitter includes two prisms, and a polarizing film provided between the two prisms.

The first, second, and third polarizing films 17R, 17G, and 17B reflect s-polarized light and transmit p-polarized light.

Therefore, the red light R guided from the separation unit 14 is reflected by the first polarizing film 17R, and is guided to the first reflective spatial modulator 18R, where it is modulated. Further, the red light R is converted into p-polarized light with its polarizing direction turned 90 degrees, passes through the first polarizing film 17R in this state, and is guided to the light combining unit 20.

The green light G guided from the separation unit 14 is reflected by the second polarizing film 17G, and is guided to the second reflective spatial modulator 18G, where it is modulated. Further, the green light G is converted into p-polarized light with its polarizing direction turned 90 degrees, passes through the second polarizing film 17G in this state, and is guided to the light combining unit 20.

The blue light B guided from the separation unit 14 is reflected by the third polarizing film 17B, and is guided to the third reflective spatial modulator 18B, where it is modulated. Further, the blue light B is converted into p-polarized light with its polarizing direction turned 90 degrees, passes through the third polarizing film 17B in this state, and is guided to the light combining unit 20.

In this embodiment, the first and second polarizing films 17R and 17G where the red light R and the green light G enter are each formed of an organic material having a low s-polarized light transmittance Ts (%).

As such an organic material, a commercially available organic film (e.g., Vikuiti™ from 3M Company) can be adopted.

The third polarizing film 17B where the blue light B enters is formed of an inorganic material. In other words, the third polarizing film 17B is formed by a dielectric film of an inorganic material or an evaporated film of an inorganic material.

While the third polarizing film 17B formed of an inorganic material has an s-polarized light transmittance Ts (%) higher than that of the organic material, it is highly resistant to ultraviolet light.

The light combining unit 20 combines the light R, the light G, and the light B passing through the first, second, and third polarizing beam splitters 16R, 16G, and 16B, and emits and guides the combined light to the projection lens 22.

While the light combining unit 20 is formed by a crossed dichroic prism in this embodiment, it may adopt various structures, for example, a crossed dichroic mirror.

The projection lens 22 emits the light guided from the light combining unit 20 onto a screen 2, thus forming an image on the screen 2.

In FIG. 1, reference numeral 21 denotes a quarter wavelength plate provided at a light emitting surface of the crossed dichroic prism that forms the light combining unit 20.

The quarter wavelength plate 21 converts polarized light emitted from the light emitting surface into circularly polarized light so as to prevent a ghost from being caused when light reflected by the projection lens 22 enters through the light emitting surface.

That is, when circularly polarized light converted by the quarter wavelength plate 21 is reflected by the projection lens 22 and passes through the quarter wavelength plate 21 again, it is converted from circularly polarized light into s-polarized light. Therefore, the s-polarized light is reflected by the polarizing beam splitters 16G, 16G, and 16B, and does not return to the reflective spatial modulators 18R, 18G, and 18B. Consequently, a ghost is prevented.

In this embodiment, the first, second, and third polarizing beam splitters 16R, 16G, and 16B and the light combining unit 20 are attached together with an adhesive, thus constituting the image synthesizing device 24.

The first, second, and third polarizing beam splitters 16R, 16G, and 16B and the light combining unit 20 may be attached together via a holding member such as a frame.

Advantages

According to the embodiment, since the first and second polarizing films 17R and 17G where the red light R and the green light G enter are formed of an organic material having a low s-polarized light transmittance Ts (%), a high contrast of an image formed on the screen 2 by the light emitted from the light combining unit 20 can be ensured.

More specifically, when a picture signal supplied to the first, second, and third reflective spatial modulators 18R, 18G, and 18B is black, light reflected by the first, second, and third reflective spatial modulators 18R, 18G, and 18B reaches the polarizing beam splitters 16R, 16G, and 16B while remaining as s-polarized light.

In this case, since the s-polarized light transmittance Ts (%) of the first and second polarizing films 17R and 17G where the red light R and the green light G enter is low, the contrast of image portions formed by the red light R and the green light, of an image formed on the screen 2, can be increased.

Further, since the third polarizing film 17B where the blue light B enters is formed of an inorganic material, it is rarely deteriorated by ultraviolet light contained in the blue light B, and the p-polarized light transmittance Tp (%) thereof does not decrease even in long-term use.

Therefore, the amount of blue light B does not become smaller than the amounts of red light R and green light G, and a high quality of an image formed on the screen 2 can be ensured for a long period.

In particular, even when the output from the light source 12 is increased for a higher image quality and the intensity of ultraviolet light contained in the blue light B increases, since the third polarizing film 17B is formed of an inorganic material, durability can be ensured. This allows the projector apparatus 10 to use a high-output light source 12.

The characteristics of the polarizing films 17R, 17G, and 17B will now be described in detail.

Figure 3:
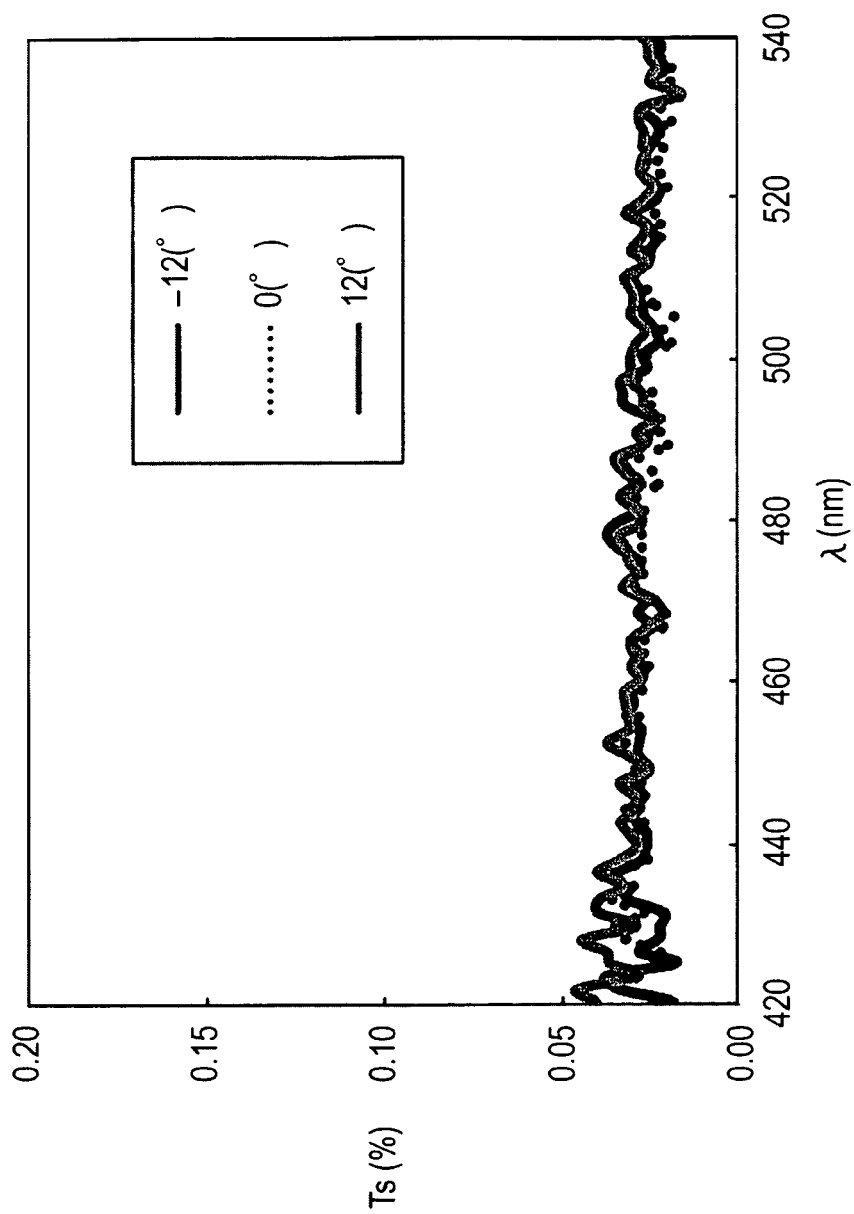
FIG. 3 shows the wavelength characteristic of an s-polarized light transmittance of a polarizing film made of an organic material.
Figure 4:
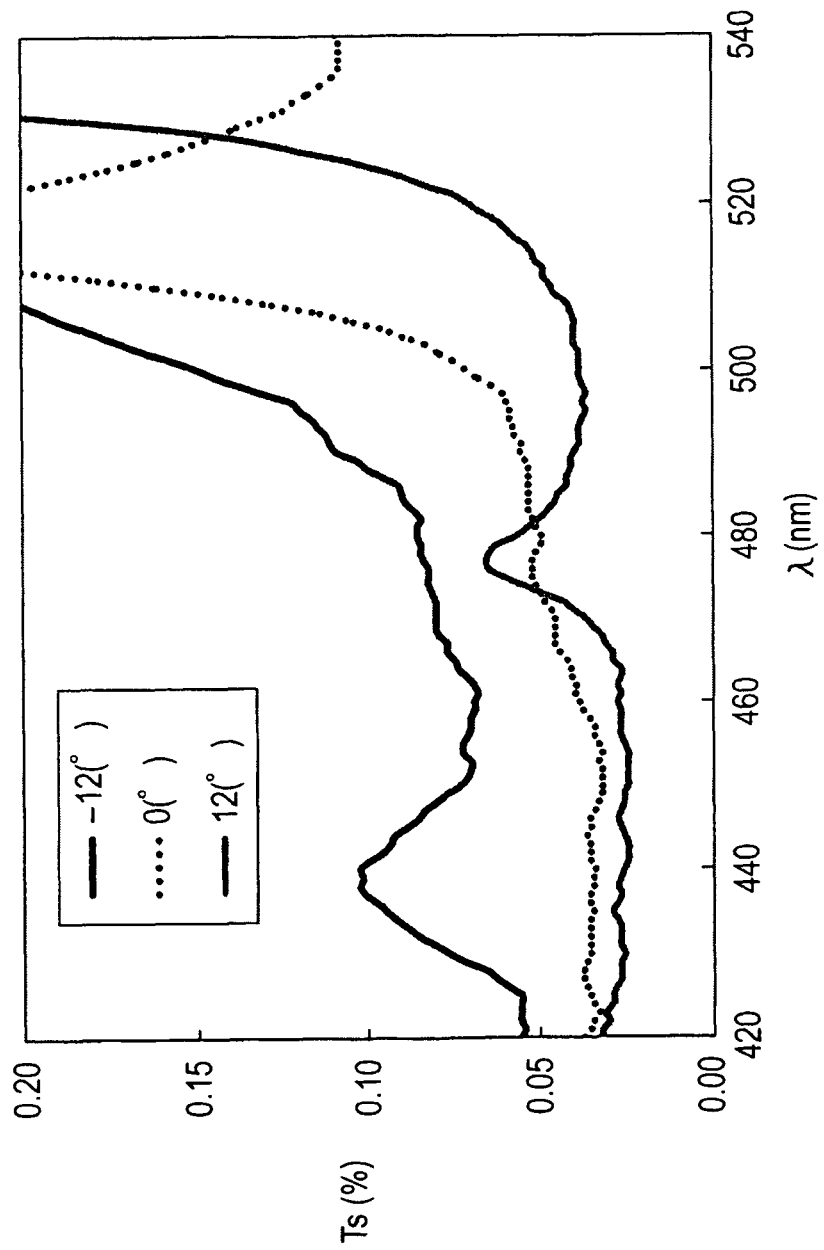
FIG. 4 shows the wavelength characteristic of an s-polarized light transmittance of a polarizing film made of an inorganic material.

FIG. 3 shows the wavelength characteristic of the s-polarized light transmittance Ts of a polarizing film formed of an organic material, and FIG. 4 shows the wavelength characteristic of the s-polarized light transmittance Ts of a polarizing film formed of an inorganic material.

In FIGS. 3 and 4, a measuring angle θ of 0° means a state in which the incident angle of incident light to the normal to the polarizing film is 45°.

Further, three measuring angles θ of 0°, +12°, and −12° are shown.

As shown in FIGS. 3 and 4, the s-polarized light transmittance Ts of the polarizing film (first and second polarizing films 17R and 17G) formed of an organic material is 0.05% or less when the wavelength λ is within the range of 420 to 540 nm.

In contrast, the s-polarized light transmittance Ts of the polarizing film (third polarizing film 17B) formed of an inorganic material exceeds 0.20% when the wavelength λ is within the range of 420 to 540 nm.

Therefore, the s-polarized light transmittance Ts of the polarizing film formed of the organic material is limited to be lower than that of the polarizing film formed of the inorganic material.

FIG. 5 shows how the p-polarized light transmittance Tp of the polarizing film of the organic material changes with time.

FIG. 5 shows the result of an acceleration test conducted by applying ultraviolet light onto the polarizing film of the organic material. As the result of the acceleration test, the p-polarized light transmittance Tp of the polarizing films decreased after 6000 hours elapsed.

FIG. 6 shows results of measurement of chromaticity conducted by emitting white light from the image synthesizing device 24.

In FIG. 6, the mark "○" indicates values measured when all the first, second, and third polarizing films 17R, 17G, and 17B are formed of an inorganic material (dielectric film).

The mark "x" indicates values measured when the transmittance (p-polarized light transmittance Tp) of the third polarizing film 17B for transmitting and reflecting blue light is normal and is decreased by half.

When all the first, second, and third polarizing films 17R, 17G, and 17B are formed of an inorganic material (dielectric film), changes in chromaticity with time are negligibly small. Therefore, an image formed on the screen 2 is kept as a normal white image.

In contrast, when the transmittance (p-polarized light transmittance Tp) of the third polarizing film 17B decreases by half, the measured chromaticity greatly increases toward the upper right of FIG. 6. Therefore, an image formed on the screen 2 is yellowish.

As is evident from the results shown in FIGS. 3 to 6, in order to ensure a high contrast of the image on the screen 2 and increase durability, it is advantageous to form the first and second polarizing films 17R and 17G, where the red light R and the green light G enter, of an organic material and to form the third polarizing film 17B, where the blue light B enters, of an inorganic material.

It should be understood by those skilled in the art that various modifications, combinations, sub-combinations and alterations may occur depending on design requirements and other factors insofar as they are within the scope of the appended claims or the equivalents thereof.

What is claimed is:
1. An image synthesizing device for a projector apparatus, the device comprising:

first, second, and third polarizing beam splitters respectively provided for red light, green light, and blue light; and a light combining unit configured to combine and output the red light, the green light, and the blue light passing through the first, second, and third polarizing beam splitters, wherein the first, second, and third polarizing beam splitters respectively include first, second, and third polarizing films, wherein the first and second polarizing films where the red light and the green light enter are each formed of an organic material, and the third polarizing film where the blue light enters is formed of an inorganic material, such that of the first, second and third polarizing films only the first and second polarizing films are formed of the organic material and of the first, second and third polarizing films only the third polarizing film is formed of the inorganic material, and wherein s-polarized light transmittances of the first and second polarizing films are lower than an s-polarized light transmittance of the third polarizing film such that with a measuring angle of any one of −12 degrees, 0 degrees, and 12 degrees each of the s-polarized light transmittances of the first and second polarizing films is 0.05 percent or less when wavelength is in a range of 420 nm to 540 nm and the s-polarized light transmittance of the third polarizing film exceeds 0.2 percent when the wavelength is in the range of 420 nm to 540 nm, in which the measuring angle has a value of 0 degrees when an incident angle of incident light relative to a normal of a respective polarizing film has a value of 45 degrees.

2. The image synthesizing device according to claim 1, wherein the third polarizing film is formed by an evaporated film made of an inorganic material.

3. The image synthesizing device according to claim 1,
wherein each of the first, second, and third polarizing beam splitters includes two prisms and the polarizing film provided between the prisms, and
wherein the light combining unit is formed by a crossed dichroic prism.

4. The image synthesizing device according to claim 1, wherein the first, second, and third polarizing beam splitters and the light combining unit are attached together.

5. A projector apparatus comprising:
a light source;
a separation unit configured to separate light from the light source into red light, green light, and blue light;
first, second, and third polarizing beam splitters respectively provided for the red light, the green light, and the blue light guided from the separation unit, the first, second, and third polarizing beam splitters respectively reflecting the red light, the green light, and the blue light;
first, second, and third spatial modulators respectively provided for the first, second, and third polarizing beam splitters, the first, second, and third spatial modulators modulating the red light, the green light, and the blue light according to image information and reflecting the red light, the green light, and the blue light so that the red light, the green light, and the blue light pass through the first, second, and third polarizing beam splitters;
a light combining unit configured to combine and output the red light, the green light, and the blue light passing through the first, second, and third polarizing beam splitters; and
a projection lens configured to project the combined light output from the light combining unit onto a screen,
wherein the first, second, and third polarizing beam splitters respectively include first, second, and third polarizing films,
wherein the first and second polarizing films where the red light and the green light enter are each formed of an organic material, and the third polarizing film where the blue light enters is formed of an inorganic material, such that of the first, second and third polarizing films only the first and second polarizing films are formed of the organic material and of the first, second and third polarizing films only the third polarizing film is formed of the inorganic material, and
wherein s-polarized light transmittances of the first and second polarizing films are lower than an s-polarized light transmittance of the third polarizing film such that with a measuring angle of any one of −12 degrees, 0 degrees, and 12 degrees each of the s-polarized light transmittances of the first and second polarizing films is 0.05 percent or less when wavelength is in a range of 420 nm to 540 nm and the s-polarized light transmittance of the third polarizing film exceeds 0.2 percent when the wavelength is in the range of 420 nm to 540 nm, in which the measuring angle has a value of 0 degrees when an incident angle of incident light relative to a normal of a respective polarizing film has a value of 45 degrees.

6. The projector apparatus according to claim 5, wherein the third polarizing film is formed by an evaporated film made of an inorganic material.

* * * * *